United States Patent [19]
Cendre et al.

[11] Patent Number: 4,951,760
[45] Date of Patent: * Aug. 28, 1990

[54] REMOTE CONTROL ACTUATION DEVICE

[75] Inventors: André Cendre, Cosne-sur-Loire; Jean Boulet, Paris, both of France

[73] Assignee: SMF International, Sur-Loire, France

[*] Notice: The portion of the term of this patent subsequent to Apr. 18, 2006 has been disclaimed.

[21] Appl. No.: 292,307

[22] Filed: Dec. 30, 1988

Related U.S. Application Data

[63] Continuation-in-part of Ser. No. 816,042, Jan. 3, 1986, Pat. No. 4,821,817.

[30] Foreign Application Priority Data

Jan. 7, 1985 [FR] France ............................. 85 00142
Apr. 2, 1985 [FR] France ............................. 85 04996

[51] Int. Cl.$^5$ .................. E21B 17/10; E21B 21/10
[52] U.S. Cl. .................................. 175/269; 175/317; 175/324; 175/325
[58] Field of Search ............... 175/73, 76, 25, 38, 175/324, 325, 232, 234, 317, 269, 99, 74

[56] References Cited

U.S. PATENT DOCUMENTS

| | | | |
|---|---|---|---|
| 2,819,040 | 1/1958 | James et al. | 175/325 X |
| 3,220,478 | 11/1965 | Kinzbach | 175/269 X |
| 3,301,337 | 1/1967 | Vaughn | 175/22 |
| 3,799,269 | 3/1974 | Brown et al. | 166/374 |
| 3,799,278 | 3/1974 | Oliver | 175/237 |
| 3,967,680 | 7/1976 | Jeter | 175/38 |
| 3,974,886 | 8/1976 | Blake, Jr. | 175/76 |
| 4,216,830 | 8/1980 | Fredd | 166/319 |
| 4,286,676 | 9/1981 | Nguyen et al. | 175/74 |
| 4,374,547 | 2/1983 | Nguyen et al. | 175/45 |
| 4,471,843 | 9/1984 | Jones et al. | 175/73 |
| 4,491,187 | 1/1985 | Russell | 175/325 |
| 4,821,817 | 4/1989 | Cendre et al. | 175/269 |
| 4,844,178 | 7/1989 | Cendre et al. | 175/325 X |
| 4,848,488 | 7/1989 | Cendre et al. | 175/325 X |

FOREIGN PATENT DOCUMENTS

| | | | |
|---|---|---|---|
| 646129 | 8/1962 | Canada | 175/73 |
| 0056506 | 7/1982 | European Pat. Off. | |
| 317663 | 1/1920 | Fed. Rep. of Germany | |
| 2267501 | 11/1975 | France | |
| 523168 | 8/1976 | U.S.S.R. | 175/38 |
| 1108723 | 4/1968 | United Kingdom | |
| 2029873 | 3/1980 | United Kingdom | 175/232 |
| 2085055 | 4/1982 | United Kingdom | |
| 2077811 | 12/1983 | United Kingdom | |

*Primary Examiner*—Hoang C. Dang
*Attorney, Agent, or Firm*—Fay, Sharpe, Beall, Fagan, Minnich & McKee

[57] ABSTRACT

An actuator for an appliance associated with a ducted body, through the duct of which flows an incompressible fluid, includes a differential piston axially moveable within the duct and operatively connected to the appliance. The piston has a tubular shape and a central bore which includes a first profiled throttling portion the minimum internal diameter of which is smaller than the internal diameter of the duct. A protruding profiled element secured in the duct body is disposed coaxially with the piston and cooperates therewith for selectively increasing the loss of head of the incompressible fluid as it flows in the direction of circulation. A spring is arranged between the piston and part of the drill string for biasing the piston in a direction of movement opposite the direction of circulation of the incompressible fluid. A measurement is provided for measuring the pressure of the incompressible fluid at the first end of the drill string. The device can serve for actuation of an orientation device for orienting a drilling tool connected to a drill string. The device can also serve for actuating a stabilizer of a set of drill rods.

15 Claims, 6 Drawing Sheets

REMOTE CONTROL ACTUATION DEVICE

This application is a continuation-in-part of application Ser. No. 06/816,042, filed 01/03/1986, now U.S. Pat. No. 4,821,817.

The invention relates, in general terms to a device for the remote actuation of an appliance associated with a drill string, in which circulates an incompressible fluid.

In exploration and extraction of hydrocarbons, the tools used have to generate high powers to carry out operations, such as drilling, and are located at the bottom of a hole at a very great distance from the place at the surface where there are the means of controlling and generating the energy required for operating the tools. These hole-bottom tools are usually supplied with incompressible fluid, such as a drilling mud, by means of a duct of very great length, one end of which is located at the surface and the other end of which is at the bottom of the hole, and which makes it possible to supply the tool with drilling mud. The end of the duct located at the surface is connected to a pumping installation which makes it possible to introduce pressurized drilling mud into the duct at a particular virtually constant rate during the operation of the tool.

Some appliances associated with the duct or with the drill string and located at a very great distance from the surface have to be remote-controlled and monitored by telemetering devices. This applies, for example, to devices for the remote adjustment of the relative orientation of two sections of a drill string and monitoring of the path of the drilling tool where inclined wells are concerned.

It is also desirable to provide a reliable and accurate remote-actuation means for the stabilizing devices used in controlled-path drilling installations.

To correct the path of the well during its advance, in order to control its direction perfectly, the use of stabilization devices or stabilizers is known, these being connected to the drillstring, usually in its part adjacent to the tool. Such stabilizer devices comprise a body connected to the drill-string and one or more blades capable of moving in a radial direction relative to the axis of the drill-string. A control means makes it possible to extract the blades towards the outside of the stabilizer body, to vary the bearing distance between the axis of the set of rods and the edges of the drilled hole. By means of these bearing blades, it is possible, depending on circumstances (vertical drilling, inclined drilling of constant direction or with a change of drilling direction), to modify in the desired way the radial forces exerted on the drill-string and consequently on the tool during drilling.

However, the control means known at the present time for making it possible to actuate the devices for the adjustment of the orientation of a drill-string or the stabilizers have a complex structure, are difficult to use and do not allow accurate and perfectly controlled movements of the movable parts of such devices or stabilizers.

The object of the invention is to propose a remote controlled actuation device for the actuation of an appliance operatively connected to a drill-string having a bore of a substantially constant internal diameter that has an incompressible fluid circulating therein in an axial direction, the drill-string comprising a first end through which the incompressible fluid is introduced by a pumping means at an adjustable flow rate and a second end which is distant from the first end and wherein the incompressible fluid is used, for example, as a working fluid, said device being positioned within the drill-string bore in a zone distant from the first end thereof, comprising:

a differential piston mounted so as to be movable in terms of translation in the axial direction and in terms of rotation about the axis of the drill-string within the drill-string bore, said piston having a tubular shape and a central bore which is substantially coaxial with the drill string bore and which comprises a profiled throttling portion the minimum diameter of which is smaller than the internal diameter of central bore of the piston, a protruding profiled element secured to the drill-string and disposed coaxially with the differential piston and having a profiled external surface matching the profiled throttling portion of the piston bore and facing said profiled portion;

a spring arranged between the piston and a part of the drill string for biasing the piston in a direction of movement opposite the direction of circulation of the incompressible fluid; and, a means for measuring the pressure of the incompressible fluid at the first end of the drill-string, the actuation device allowing for the circulation of the fluid in the duct at a first, operating, flow rate without any movement of the piston, wherein a movement of the piston in the direction of circulation of the fluid occurs when the fluid circulates at a second, actuation, flow rate greater than said first operating flow rate and wherein an increasing loss of head is caused when the piston moves in the direction of circulation of the fluid by a cooperation of the profiled portion of the piston bore and the profiled external surface of the protruding profiled element, the movement being stopped after the actuation has been carried out at which point a loss of head and a pressure of the working fluid are at a maximum but working fluid still flows through said central bore, and wherein the pressure of the fluid is continuously measured thereby allowing a remote monitoring of the movement of the piston, and wherein said differential piston further comprises, on its outer lateral surface, longitudinal grooves relative to the axis of the set of rods, arranged one after the other over the periphery of the piston and connected to one another by means of matching parts to form a continuous actuating surface for the step-by-step rotary movement of the piston and for its return into the initial position, and at least one actuating finger interacting with the actuating surface on the one hand and a movable part of the appliance on the other hand, to actuate the latter during the movement of the piston.

To make the invention easy to understand, actuation devices according to the invention, used in the drilling of oil-wells for controlling an orientation device and a stabilizer, respectively, will now be described as non-limiting examples, with reference to the attached Figures.

Figure 1:
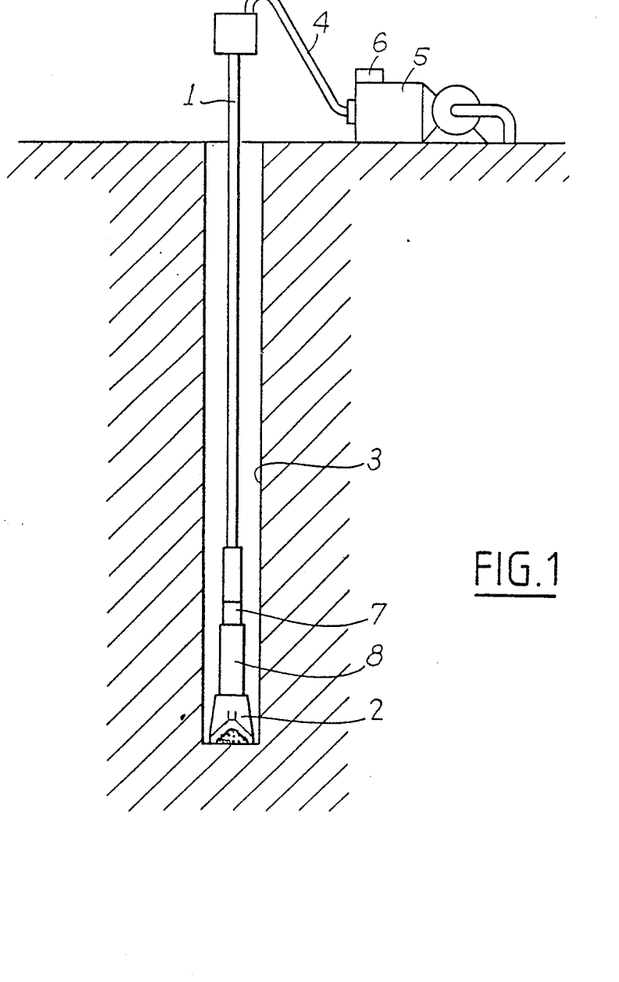
FIG. 1 is a diagrammatic view of a drilling, installation incorporating an appliance which can be actuated by a device according to the invention.

FIG. 1 shows a drilling installation comprising a drill-string 1 carrying the drilling tool 2 at its lower end. The tool 2 has been shown in its working position at the bottom of the hole 3. The drill-string 1 forms a duct of great length, one end of which is connected to the hole-bottom tool 2 and of which the other end located at the surface is connected to a duct 4 allowing drilling mud to be injected at high pressure and at a constant rate into the inner bore of the drill-string 1. For this purpose, the duct 4 is connected to a pumping installation 5, on which a measuring device 6 makes it possible to determine the pumping pressure accurately. The drilling mud descends in the set of rods, supplies the tool 2 at the bottom of the hole and rises to the surface again via the hole 3 outside the drill-string 1. An appliance 7 for orienting the tool 2 and a telemetry unit 8 are associated with the drill-string 1 above the part where the tool 2 is joined to the drill-string. The pressurized drilling mud is used as a working fluid for the drilling tool 2.

Figure 2:
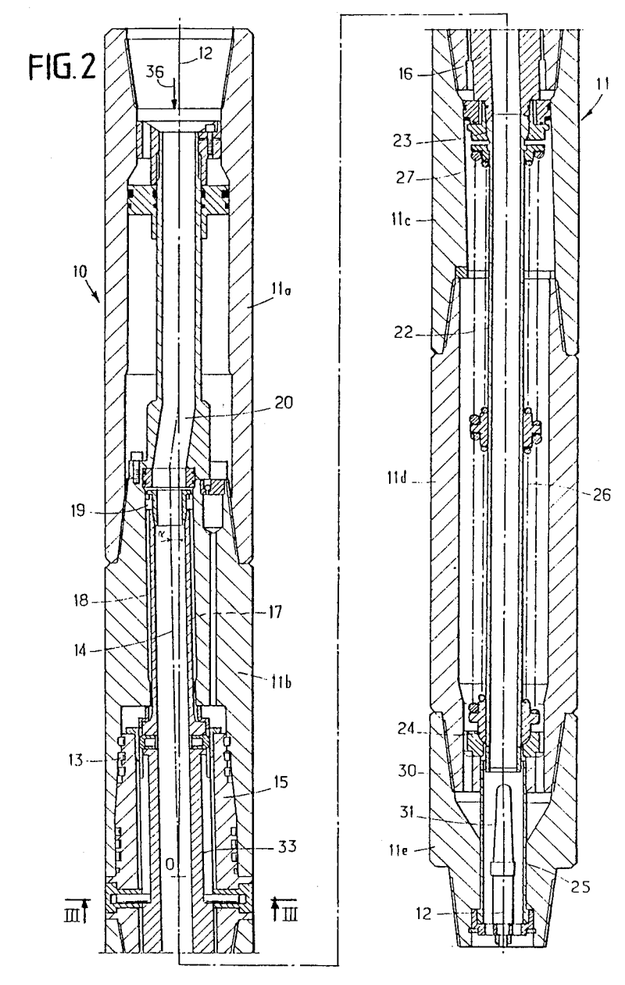
FIG. 2 is a view in longitudinal section of an orientation device of a drill-string controlled by an actuation device according to the invention.

FIG. 2 shows an appliance, such as the orientation device 7 for orienting a drilling tool and an embodiment of an actuation device according to the invention, making it possible to operate remotely the orientation device.

The orientation device 10 comprises a tubular body 11 consisting of five sections 11a, 11b, 11c, 11d and 11e connected between them through tapered portions. The tubular body 11 as a whole is interposed between two parts of the drill-string, preferably in the neighbourhood of the drilling tool as the device 7 shown in FIG. 1.

The upper section 11a of the tubular body is connected to the upper part of the drill-string and the lower section 11e to the lower part of the drill-string which can be constituted by a measuring device or the tool support.

The axis 12 of the tubular body 11 is aligned with the axis of the bore of the drill-string and the central bore of the tubular body communicates with the bore of the drill-string in such a way that the drilling mud can circulated axially through the device 10.

The orientation device in itself which is of the type described in the U.S. Pat. No. 4,286,676 and 4,374,547 comprises a variable angle coupling consisting of a frusto-conical bearing 13 the axis of rotation 14 of which intersects the axis 12 of the drill-string at a point 0 and makes with the axis 12 a non-zero angle α.

The bearing 13 is formed by a frusto-conical element 15 mounted in a frusto-conical bore of the section 11b interposed between the sections 11b and 11c and rigidly connected to the section 11c.

It will be easily understood that, when the element 15 is rotated about its axis 14 the lower sections 11c, 11d and 11e of the tubular body 11 and the lower part of the drill string can be oriented with respect to the axis 12 of the upper part of the drill-string.

Figure 3:
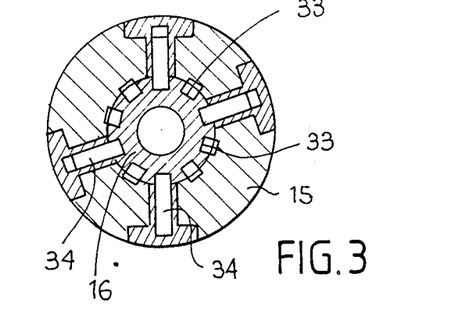
FIG. 3 is a sectional view of the orientation device along the line 3—3 of FIG. 2.

The actuation device of the invention that will be now described referring to FIGS. 2 and 3 allows the element 15 to be remote controlled for rotation about its axis of rotation 14. The element 15 comprises a central bore in which is mounted the central body of a tubular piston 16 movable in translation along the axis 14 and in rotation about the same axis.

The tubular piston 16 comprises a first tubular part 17 protruding outside the element 15 into a duct 18 arranged in the section 11b in which the tubular part 17 is guided and mounted slidable and in a sealed manner by way of O-ring gaskets 19.

The duct 18 communicates with a curved duct 20 fixed in the element 11a and communicating itself with the bore of the drill-string.

The tubular piston 16 further comprises a second tubular part 22 connected at the end part of the central body of the piston 16 opposed to the tube 17, by way of a ball and socket joint 23. The second tubular part 22 is mounted in the bore of the section 11d of the body 11 and slidably arranged in a bearing 24 fixed to the section 11d at its lower end.

Helicoidal springs 26 are interposed between a retaining ring 27 and the bearing 24.

A tube 25 is fixed axially in the section 11e of the tubular body 11 and communicates on the one hand with the central bore of the piston 16 and on the other hand with the bore of the lower part of the drill-string.

The end part of the tubular part 22 directed to the tube 25 comprises a profiled throttling portion 30 the internal diameter of which is smaller than the internal diameter of the central duct of the piston 16.

A protruding profiled element of conical shape or needle 31 is arranged axially in the tube 15, facing the profiled portion 30 of the piston 16.

The central body of the piston 16 comprises, as shown in FIGS. 2 and 3 a set of longitudinal grooves 33 arranged one after the other over the periphery of the piston 16 and connected to one another by means of curved matching parts to form a continuous actuating surface. Four actuating fingers are arranged radially in the central body of the element 15 in such a way that they interact with the grooves 33 through their internal end parts.

The drilling mud circulating in the direction of the arrow 36 circulates axially in the device 10 through the duct 20, the central bore of the piston 16 and the tube 25. When flowing through the throttled portion 30 of the piston 16 constituting a diaphragm, the drilling mud is subjected to a loss of head in such a way that the pressure of the drilling mud is lower down-stream of the piston 16 than upstream.

When the drilling mud circulates in the drill-string at its normal operating rate, the springs 26 keep the piston 16 in its position shown in FIG. 2.

When the flow rate of the drilling mud is increased to a control rate of the actuation device higher than the operating rate, the piston 16 moves in the direction of the arrow 36 and the throttled portion 30 comes near the needle 31. The loss of head and the force applied to the piston increase.

During the displacement of the piston 16, the fingers 34 move along the grooves 33 and at the end of the displacement, interact with the curved matching parts of said grooves making the element 15 turn about the axis 14, of a well defined angle of rotation.

The flow rate of the drilling mud is then decreased to a very low value and the springs 26 return the piston 16 in its position as shown in FIG. 2 after a supplemental rotation of the element 15

The rotation step-by-step of the element 15 can thus be obtained by controlling the flow rate of the drilling mud through the pump 5.

The lower part of the drill-string can thus be oriented as required with respect to the upper part.

Moreover, the displacements of the piston 16 and the movable element 15 of the appliance can be easily monitored as it will be further explained.

Figure 4:
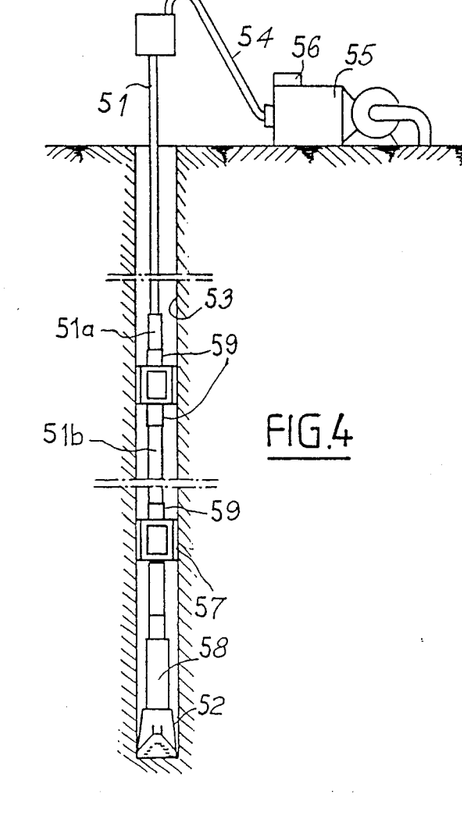
FIG. 4 is a diagrammatic general view of a controlled-path drilling device possessing stabilizers controlled by an actuation device according to the invention.

FIG. 4 shows a drilling installation comprising a set of drill rods 51 carrying at its lower end a drilling tool 52 and connected at its other end, by means of a duct 54, to a pumping installation 55 which makes it possible to inject drilling mud through the interior of the drill-string 51 to the tool 52 in its working position at the bottom of the hole 53.

The drill-string 51 comprises successive rods, such as 51a and 51b, which, as can be seen in FIG. 1, are connected to one another and to the drilling tool 52 by means of intermediate elements comprising a stabilizer 57 and joining pieces 59.

Arranged on the pumping device 55 is a means 56 of measuring the pumping pressure of the drilling mud.

A measuring unit 56 is associated with the tool and makes it possible, in particular, to measure the orientation of the set of rods 51.

Figure 5:
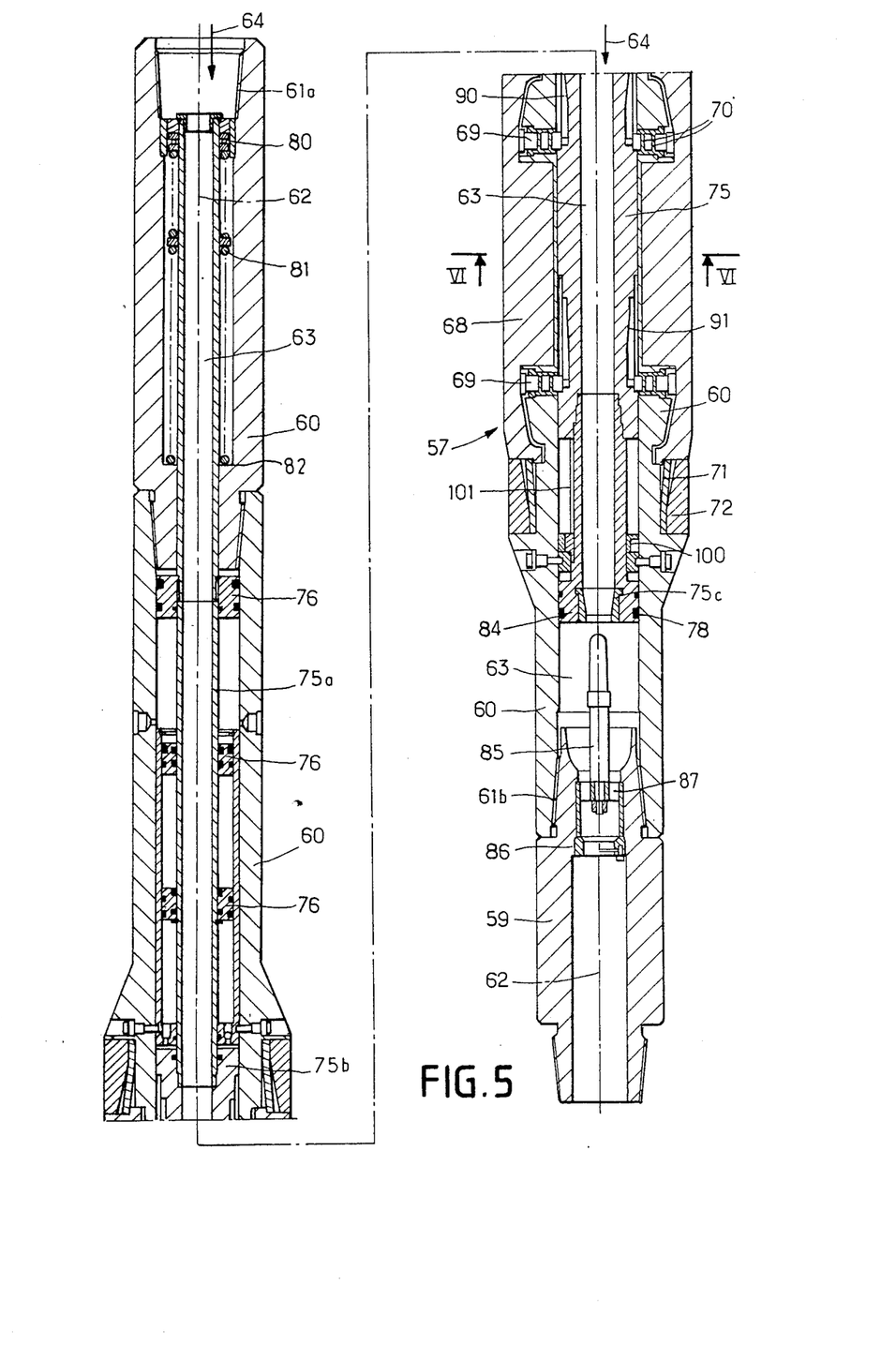
FIG. 5 is a view in longitudinal section, along the line 5—5 of FIG. 6, of a stabilizer of the drilling device illustrated in FIG. 4.

FIG. 5 shows a stabilization device designated as a whole by reference numeral 57, which comprises a body 60 of general tubular shape in several parts having tapped ends 61a and 61b making it possible to join the stabilizer 57 to the set of rods or to the tool by means of threaded couplings, such as 59. When the stabilizer is connected to the set of rods, the axis 62 of the bore 63 of the body 60 is identical to the axis of the set of rods. The drilling mud circulates in the set of rods and the stabilizer axially in the direction of the arrow 64.

Figure 6:
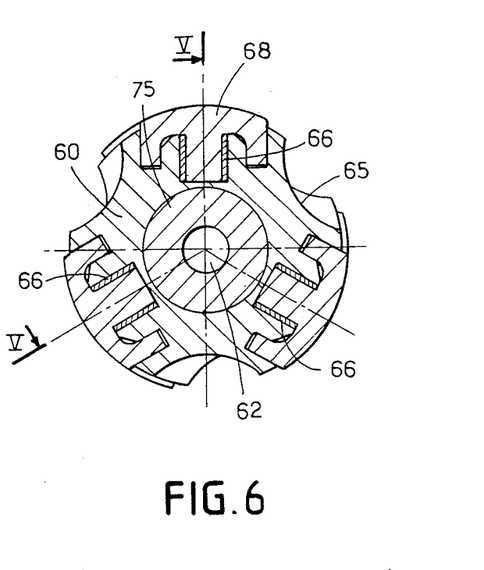
FIG. 6 is a sectional view of the stabilizer along the line 6—6 of FIG. 5.

As can be seen in FIGS. 5 and 6, the body 60 has, on its peripheral surface, indentations 65 to allow the drilling mud to pass outside the stabilizer when it returns to the surface within the hole 53. The body 60 also has slots 66 serving for accommodating the bearing blades 68. The stabilizer illustrated in FIGS. 5 and 6 has three bearing blades 68 arranged in slots 66 placed at 120° round the body of the stabilizer. Leaf springs 71, one end of which is fastened to the body 70 by means of screws, bear by means of their other end on the end parts of the blades 68, so as to keep them in the position retracted in the radial direction, as shown in FIGS. 5 and 6 Closing pieces 72 mounted in the end parts of the slots 66 outside the leaf springs 71 make it possible to guide the blades 68 in their radial direction of movement. A play is reserved for assembly between the leaf spring 71 and the closing piece 72, to allow a certain movement of the bearing blade in the radial direction between its position of complete retraction, shown in FIGS. 5 and 6, and a position of extraction or extension of the bearing blade 68 under the effect of a pair of actuating fingers 69 mounted so as to be movable in the radial direction within the body 60. Each of the fingers 69 is mounted movably and in a sealed manner in the body 60 by means of O-ring gaskets 70.

Mounted inside the bore 63 of the body 60 is a tubular piston 75 which, to make it possible to mount it, has three parts 75a, 75b and 75c joined to one another in a sealed manner. The piston 75 is mounted so as to slide in the bore 63 by means of a part of its peripheral surface and matching an O-ring gasket 78 arranged at one of its ends and by means of slidable sealing devices 76 fixed to the tubular part 75a.

Located at the end of the part 75a of the piston, is a ball thrust-bearing 80, against which the end of a helical spring 81 comes to rest, the other end of the latter bearing on a shoulder 82 provided in the body 60 inside the bore 63. A profiled annular piece 84 of frusto-conical shape is also mounted inside the part 75c of the piston 75 at its end corresponding to the outflow of the drilling fluid circulating in the direction of the arrow 64.

A second profiled piece 85 or needle is arranged inside the body 60 in the axis 62 of the bore 63 of this 60. The needle 85 is fastened in this body 60 by means of an annular supporting piece 86 having openings 87 for the passage of the drilling mud.

The drilling fluid circulating in the direction of the arrow 64 experiences a loss of head as a function of its flowrate, when it leaves the piston 75 via the profiled outlet 84. At a certain flowrate, called the actuation rate, the pressure difference on either side of the piston 75 becomes sufficient to exert a force greater than the force of the spring 81 on this piston, with the result that the piston 75 starts to move axially in the direction of the arrow 64. The inner profile of the piece 84 interacts with the outer profile of the needle 85 to reduce the passage cross-section of the fluid progressively and increase the loss of head in proportion. At the end of the movement of the piston, the loss of head becomes very great and corresponds to a value which can easily be detected at the pumping installation by means of the pressure-measuring device 56 associated with this pumping installation 55. Thus, the movement of the piston 75 is controlled by the flow-rate of the pumping fluid and is monitored perfectly from the surface by means of a pressure measurement.

Such a remote-actuation device has high stability, since the loss of head generating the force moving the piston increases continuously during the movement of this piston.

Machined on the outer lateral surface of the piston 75 are actuating slopes forming two sets 90 and 91 spaced longitudinally from one another on the piston 75 and each interacting with an assembly of three actuating fingers 69 located at one of the ends of the blades 68.

The slopes 90 and 91 are inclined in the same sense in the radial direction in relation to the axis 62 common to the piston 75 and to the bore 63. This inclination makes it possible to move the blades radially during the axial movement of the piston in the direction of the arrow 64.

Figure 7:
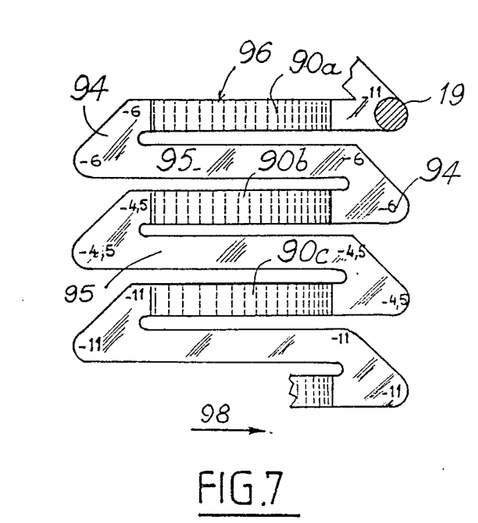
FIG. 7 is a laid-out view of the actuation surface of the stabilizer.

By reference to FIG. 7, it will be seen that successive inclined slopes 90a, 90b, 90c are arranged one after the other on the piston 75 over its periphery. A complete cycle of movement of a blade 68 is obtained by means of the three successive inclined slopes 90a, 90b and 90c, of which the machining depths at their ends and from the outside diameter of the piston 75 are indicated (in $10^{-3}$ m) in FIG. 7. Each of the fingers 69 is maintained, via the springs 71 of the corresponding blade 68, in contact with the bottom of a slope 90 by means of an end part machined in the form of a spherical bearing surface.

As can be seen in FIG. 7, the movement of the piston in the direction of the arrow 93 makes it possible to shift the end of the finger 69 from the level $-11$ to a level $-6$ as a result of the interaction of this finger 69 with the slope 90a. In the same way, the slope 90b makes it possible to shift the finger from the level −6 to the level −4.5. These two movements along the slopes 90a and 90b are therefore accompanied by a radial movement of the fingers 69 towards the outside of the body 70 and therefore by an outward movement of the blades 68. The distribution of the slopes over the periphery of the piston 75 is such that, at each moment, all the fingers 69 come in contact with a set of identical slopes, and the movements of these fingers in the radial direction are therefore identical at every moment. The slope 90c corresponds to a shift of the fingers 69 from the level −4.5 to the level −11, and this corresponds to a return of the fingers 69 to their initial position and a return of the blades 68 to their retracted position.

Thus, each of the three fingers 69 of an assembly executes a complete cycle of movement with three slopes 90a, 90b and 90c. The total number of slopes constituting the assembly 90 is therefore 3×3=9.

It can be seen from FIG. 7 that the slopes 90a, 90b and 90c are connected to one another by means of curved parts 94 and by means of straight parts 95 of constant level, to form a continuous actuating surface 96 arranged on the periphery of the piston 75. The curved parts 94 joining the end of the slopes 90 to the end of the straight parts 95 make it possible to rotate the piston 75 step by step in the direction of the arrow 98 as a result of the interaction of the end of the finger 69 with the curved part 94, at the end of the movement of the piston 75 in one direction or the other. Each of the steps corresponds to the angular distance between the slope 90 and the adjacent plane part 95, that is to say 360°/18=20°.

In one direction, the driving force is generated as a result of the loss of head of the drilling fluid and, in the other direction, by the energy stored in the spring 81.

The step by step rotary movement of the piston can occur only in the direction of the arrow 98, a free-wheel 100 (FIG. 5) being mounted in the bore 63 of the body 60 round the part 75c of the piston 75. The piston is made integral in terms of rotation with this free-wheel by means of a key engaged in a longitudinal keyway 101 machined on the part 75c of the piston. The piston 75 can thus move longitudinally relative to the free-wheel 100 to execute its to-and-fro movements under the action of the fluid and under the action of the spring 81.

Thus, each of the longitudinal movements of the piston in the direction of the arrow 64 as a result of the action of the circulating drilling fluid results in a radial movement of the blades in the extraction direction (two successive steps) and in the retraction direction (one step of longitudinal movement). Because the steps of longitudinal movement of the piston are recorded at the surface, the exact position of the blades is ascertained, thus making it possible to monitor the stabilizer very effectively. This recording of the steps in the way indicated is extremely easy, because the end of each of the drive movements of the piston in the longitudinal direction results in a sharp increase in the pumping pressure as it will be described with reference to FIG. 8.

The mode of operation of the device is as follows:
With blades in their retracted position, as shown in IGS. 5 and 6, a flow at least equal to the actuation rate the device is conveyed into the set of rods, thus causa movement of the piston and an automatic and gressive increase in the loss of head, until the piston hes its end position, the loss of head then being at naximum. Recording the pressure from the surface makes it possible to determine the end of a step of movement of the piston. If the blades are extracted a sufficient amount, the device is automatically maintained in position as long as the feed flow of drilling fluid is not cancelled. If an additional step is to be executed to extract the blades an additional amount, the feed flow of drilling fluid is cancelled and the piston returns into its initial position as a result of the action of the spring 81. Meanwhile, a rotation of the piston through 20° has allowed the finger 69 to be positioned on a plane part 95 of the actuating surface 96. At the end of the plane part 95, the curved part 94 of the actuating surface 96 allows the piston to rotate 20° again in the desired direction by means of the free-wheel 100, so that the finger 69 is in alignment with the following slope 90b. As a result of an increase in the flowrate of the drilling fluid up to the value of the actuation rate, the piston 75 is moved in the direction of the arrow 93, the fingers 69 and the blades 68 being moved an additional step outwards and in the radial direction. It is obvious that the system can be returned to the initial state as a result of successive passes of the fingers 69 over the plane part 95 at the level −4.5 and over the slope 90c.

All these movements can be followed perfectly from the surface by recording the pressure.

Figure 8:
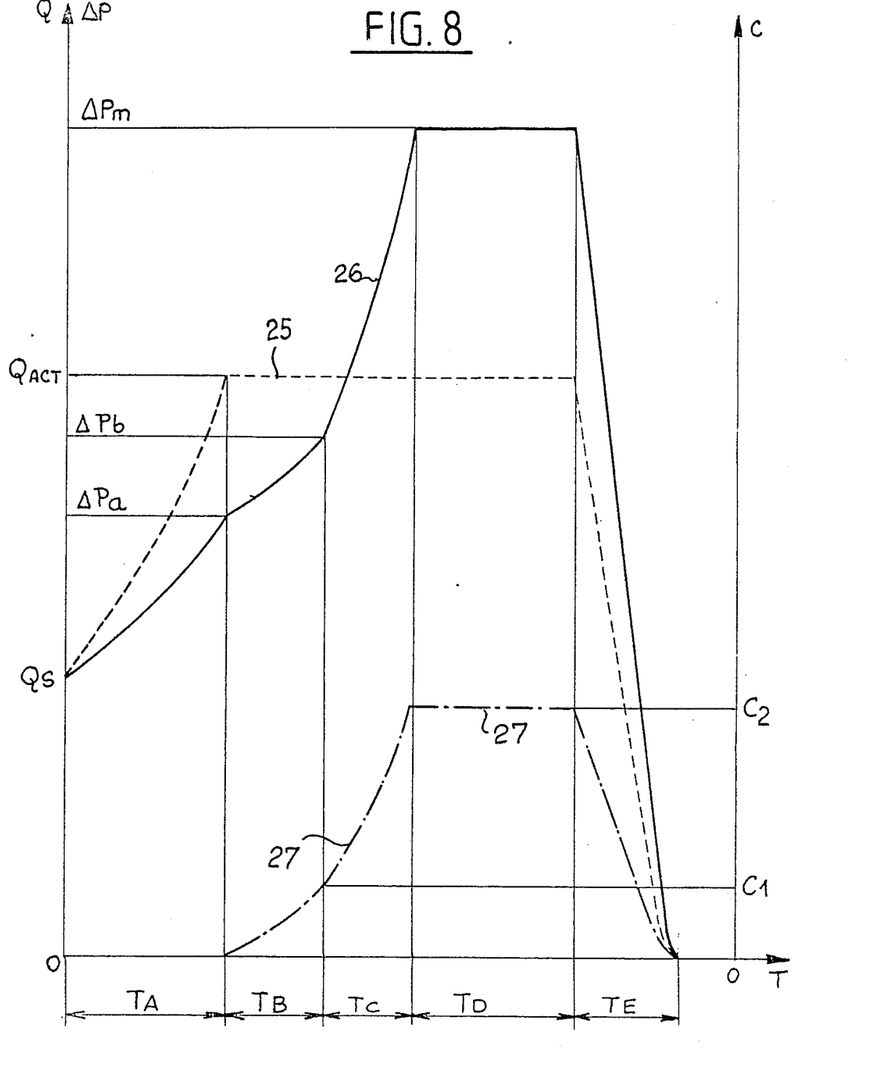
FIG. 8 is an operating graph of an actuation device according to the invention, showing the variations in time of various characteristic parameters during an operating cycle of the device.

FIG. 8 shows an operating graph for the orientation device shown in FIG. 2 or of the stabilizer shown in FIG. 5, the time being plotted on the abscissa and the flowrate Q of the drilling mud, the loss of head P through the actuation device and the stroke of the differential piston 16 or 75 being plotted on the ordinate. The variation in time of the flowrate Q during an operating cycle of the actuation device has been represented by the curve 25 indicated by broken lines, the variation in loss of head P by the curve 26 indicated by unbroken lines and the variation in the stroke C of the piston 16 or 75 by the curve indicated by dot-and-dash lines 27.

The origin of the graph represents the operating point at the operating rate QS of the drilling mud and with zero movement of the piston 16 or 75.

To use the actuation device, the flowrate of the drilling mud is increased progressively during the first period $T^A$ of the actuating cycle, to bring this flow rate from the value O or QS to a value $Q_{ACT}$ or actuating rate. At the end of this part of the cycle, the loss of head in the profiled part 30 of the piston 16 (or in the profiled part 84 of the piston 75) reaches a value Pa which is such that the excess pressure on the front face of the piston generates a force which begins to exceed the return force of the spring. The piston then moves downwards to execute a stroke C1, the flowrate being maintained at the value $Q_{ACT}$. The loss of head increases slowly from the value Pa to the value Pb as a result of a slow reduction in the outlet cross-section of the piston 16 or 75 during the second phase B of the operating cycle. The stroke C1 of the piston 16 or 75 has then brought its profile 30 (or 84) opposite the profile of the needle 31 (or 85). The loss of head P increases very quickly and the piston moves downwards at an increased speed during the phase C of the operating cycle. The flowrate is maintained at the value $Q_{ACT}$ by means of the pumping installation 5 (or 55), the movement of the piston is self-maintained as a result of the increase in the loss of the head, and the piston 10 (or 75) moves until the fingers 34 (or 69) come up against the end part of the grooves 33 (or 90–91) by executing the stroke C2. The loss of head then changes from the value Pb to its maximum value Pm. This increase in the loss of head is considerably greater than that which could be obtained by means of an increase in the flowrate in a diaphragm with a constant aperture.

The fingers interact with a movable part of the appliance (either the rotatable element 15 or the blades 68) during the displacement of the piston either in translation or in rotation.

If, during the manoeuvre of the appliance 7, at the constant rate $Q_{ACT}$ the force exerted by the piston 16 or 75 becomes insufficient to continue carrying out the manoeuvre, the loss of head no longer increases. A plateau at a value of $Pi < Pm$ is recorded. It is then sufficient to bring the flowrate to a value $Q_{ACT}$ to end the manoeuvre of the appliance 7. The maximum loss of head occurs at a value $Pm < Pm$. The flowrate can subsequently be returned to and maintained at the value $Q_{ACT}$ which is sufficient to keep the piston 10 in the lower position.

As long as the flowrate is maintained at the value $Q_{ACT}$, the differential piston 16 or 75 remains in its lower position and the loss of head P remains at its maximum value.

The piston is returned to its upper position shown in FIGS. 2 and 5 by progressively reducing the flowrate to bring it down to the value O (phase E). The tool 2 can subsequently be operated by increasing the flow rate to the value of the operating rate $Q_S$, and with the appliance associated with the actuation device being in the new position.

During the entire operating cycle, the flowrate is increased to and maintained at $Q_{ACT}$ by means of the pumping installation 5, and the variations in pumping pressure P are detected and recorded by the measuring instrument 6. Both the control and the monitoring of the operating cycle are therefore carried out without difficulty from the surface, without using a remote-control device. In particular, it is easy to detect and record a stop of the piston before the end of the manoeuvre, this producing a pressure plateau. In this case, the manoeuvre is continued by increasing the flowrate to a sufficient value to release the appliance. The pumping means 5 must therefore make it possible to increase the flow rate to values higher than $Q_{ACT}$, where required. In general, during the entire operating cycle of the device, recording the excess pressure corresponding to the loss of head P as a function of time makes it possible to ascertain the position of the piston 16 or 75 and therefore monitor the actuation of the device. A recorder recording the pressure as a function of time is therefore associated with the measuring device 6 (or 56).

To obtain a return of the piston to its initial position after the appliance has been actuated, it may only be necessary to reduce the pumping rate to a non-zero value below $Q_S$. The tool 2 can subsequently be operated by increasing this rate again to the value $Q_S$.

The main advantages of the actuation device according to the invention are evident in the description which has just been given: this actuation device does not require any remote-control means, because it is operated and monitored by using the pumping and measuring means normally associated with the drill string; this actuation device is particularly simple and has a high operating reliability; it is manoeuvred by means of very simple operations which can easily be monitored; there is no need to use any element in addition to those of the drill string at the time when it is installed.

If the actuation device is used to control a stabilization device, the successive movements of the bearing blades in one direction or other are monitored perfectly and take place under very good conditions of stability. On the other hand, the device is of relatively low overall size, in spite of its many possibilities.

The invention is not limited to the embodiments which have been described; on the contrary, it embraces all their alternative forms.

Thus, the piston and the profiled elements associated with it can have a different form from those described. The profiled elements can be associated with the piston or, on the contrary, independent of this piston. The form of these profiled elements can be different from the forms described. These forms are intended to ensure that the pressure/time graph and the maximum loss of head Pm correspond to the operating conditions of the appliance with which the actuation device is associated.

The means of returning the piston can be different from a mechanical spring.

The means receiving the driving force of the piston which is a movable part of the appliance, can have any form depending on the nature of the appliance.

The operating cycle of the tool can differ from that described, and in particular a phase preceding the rapid movement of the piston can be characterized by an extremely low loss of head, thus making it possible to separate the inactive phase distinctly from the active phase of the appliance.

Where a device actuating a stabilizer is concerned, the number of different successive slopes forming a set of slopes can be different from three, if a movement with a series of steps less than or more than three is to be executed. It is possible to use less than three blades and, if appropriate, a single bearing blade on the stabilizer, either associated with other fixed blades or not, or on the contrary use a number of blades greater than three. Blades arranged in the direction of the axis of the set of rods or blades inclined relative to this axis can be used.

At all events, the number of slopes arranged on the periphery of the actuating piston will equal the number of blades multiplied by the number of different steps of movement of the blades in the radial direction.

The blades can be mounted in a different way from that described, and blades of a different form can be used.

A means different from a free-wheel can be associated with the piston, to prevent it from rotating in one direction and to allow it to rotate in the other direction.

The drilling device according to the invention can incorporate any number of stabilizers, each having any number of blades, at least one of which is radially movable.

In general terms, the actuated appliance can consist not only of devices orienting a drilling tool or devices stabilizing a drill string, but also of devices for perforating a casing or for inflating sealing disphragms in a well or a bore-hole, using the excess pressure attributed to the loss of head. The actuation device according to the invention can be used or any appliance employed in the drilling of oil wells.

We claim:

1. A remote controlled actuation device for the actuation of an appliance operatively connected to a drill-string having a bore of a substantially constant internal diameter that has an incompressible fluid circulating therein in an axial direction, the drill-string comprising a first end through which the incompressible fluid is introduced by a pumping means at an adjustable flow rate and a second end which is distant from the first end and wherein the incompressible fluid is used as a working fluid, the device being secured to the drill-string in a zone distant from the first end thereof, the device comprising:

a body connected to the drill-string, said body having a central bore coaxial with the drill-string bore;

a differential piston mounted so as to be movable in terms of translation in the axial direction and in terms of rotation about a longitudinal axis of said body within said central bore thereof, said piston having a tubular shape and having a central bore which is substantially coaxial with said body central bore and which comprises a profiled throttling portion the minimum internal diameter of which is smaller than the internal diameter of the central bore of the piston;

a protruding profiled element secured to the body downstream of said differential piston and disposed coaxially with the differential piston, said element having a profiled frustoconical external surface widening in the direction of circulation of the fluid and facing the profiled throttling portion of the piston bore;

a spring arranged between the piston and a part of the body for biasing the piston in a direction of movement opposite the direction of circulation of the incompressible fluid; and, a means for measuring the pressure of the incompressible fluid at the first end of the drill-string, the actuation device allowing for the circulation of the fluid in the drill-string at a first, operating flow rate without any movement of the piston, wherein a movement of the piston in the direction of circulation of the fluid occurs when the fluid circulates at a second and constant actuation flow rate greater than said first operating flow rate and wherein an increasing loss of head is caused when the piston moves in the direction of circulation of the fluid by a cooperation of the profiled throttling portion of the piston bore and the frustoconical external surface of the protruding profiled element, the movement being stopped after the actuation has been carried out at which point a loss of head and a pressure of the working fluid at the first end of the drill string are at a maximum but working fluid still flows through said central bore, and wherein the pressure of the fluid is continuously measured thereby allowing a remote monitoring of the movement of the piston; and wherein said differential piston further comprises, on its outer lateral surface, longitudinal grooves relative to the axis of the drill-string, arranged one after the other over the periphery of the piston and connected to one another by means of connecting grooves to form a continuous actuating surface for a step-by-step rotary movement of the piston and for its return into an initial position when the flow rate of the fluid is decreased to the operating flow rate, and at least one actuating finger interacting with the actuating surface at one end and a movable part of the appliance on the other end, to actuate the latter during the movement of the piston.

2. A remote controlled actuation device according to claim 1 wherein said movable part of the appliance comprises a stabilizer which is operatively connected to both the body and the actuation device wherein said stabilizer comprises at least one bearing blade mounted on an outer periphery of the body so as to be radially movable in relation to the body;

said differential piston longitudinal grooves having bottom surfaces inclined in a radial direction relative to the axis of the drill string; and, wherein said at least one actuating finger is radially movable in relation to the body, and interacts both with the piston actuating surface and the at least one bearing blade, to actuate the at least one bearing blade radially outwardly during a movement of the piston, wherein the actuation device allows for the circulation of the fluid in the drill string bore at a first, operating, flow rate without any movement of the piston, wherein a movement of the piston in the direction of circulation of the fluid occurs when the fluid circulates at a second, actuation, flow rate greater than said first operating flow rate and wherein an increasing loss of head is caused when the piston moves in the direction of circulation of the fluid by a cooperation of the frustoconical external surface of the protruding profiled element, the movement of the piston allowing an actuation of the stabilizer.

3. The device according to claim 2, further comprising a means associated with the piston to prevent it from rotating in one direction and to allow it to rotate in the other direction.

4. The device according to claim 3, wherein the means comprises a free-wheel mounted in the bore of the body and encircles the piston, and wherein the piston is connected in terms of rotation and is free in terms of translation in relation to said free-wheel which allows the step-by-step rotary movement of the piston in one direction only.

5. The device according to any one of claims 2, 3, or 4 further comprising an elastic means for returning the at least one blade into a retracted position, said elastic means comprising leaf springs fastened to the body and bearing on an end of the at least one blade.

6. The device according to claim 5, further comprising closing pieces which are arranged above the leaf springs towards an outer surface of the body to ensure that the at least one blade is guided and maintained within slots provided in the outer surface of the body.

7. The device according to claim 2, wherein the stabilizer includes three blades spaced around the outer periphery of the body, and wherein two actuating fingers are associated with each of said three blades, the fingers being each maintained in contact with the actuating surface of the piston, wherein the sets of fingers are circumferentially spaced from one another.

8. The device according to claim 2, wherein the loss of head, caused when the piston moves in relation to the protruding profiled element, is caused by cooperating surfaces on the piston and the profiled element, wherein the profiled element is needle shaped, and wherein an axis of revolution of said profiled element is coaxial with an axis of the drill string.

9. A remote controlled actuation device for a drill string comprising:

a tubular body having a first end and a second end and having a bore extending longitudinally therethrough from said first end to said second end;

a piston movably mounted in said bore of said body and actuated by a flow of working fluid through said body bore, said piston being tubular in shape and having a bore extending longitudinally therethrough which piston bore is coaxial with said body bore, said piston bore including an orifice portion, said piston also having on its outer surface a plurality of longitudinal grooves whose bottom surfaces are inclined in a radial direction relative to a longitudinal axis of said body and are connected to one another so as to form a continuous actuating surface for a step by step rotary movement of said piston;

a flow restrictor element secured in said body bore and disposed coaxially with said piston, said element having a tapered external surface which has a maximum outer diameter, said tapered external surface being adapted to cooperate with said piston bore to limit a flow of fluid therethrough, wherein said maximum outer diameter of said flow restrictor element is sufficiently smaller than a minimum internal diameter of said piston bore so as to leave an annular space through which working fluid continues to flow at all positions of said piston;

a biasing means for biasing said piston in one direction, said piston having a final location as said piston moves in a direction opposite said one direction, said final location being such that said piston bore orifice portion is located adjacent a section of said flow restrictor element which section has said tapered external surface maximum outer diameter;

an appliance including a movable element which is operatively connected to said body; and, at least one actuating finger slidably mounted in lateral holes in said tubular body so as to be radially movable in said body as said at least one finger interacts with said movable element of said appliance and said piston, said holes in said body being located radially inwardly of said movable element of said appliance and radially outwardly of said piston.

10. The device of claim 9 wherein said movable element of said appliance comprises a bearing blade of a stabilizer.

11. The device of claim 10 wherein said stabilizer includes three bearing blades which are equally spaced around an outer periphery of said body.

12. The device of claim 9 wherein said body has a longitudinal axis and wherein said piston moves along said body longitudinal axis and also rotates around said body longitudinal axis, and further comprising a means associated with said piston to prevent it from rotating in one direction and to allow it to rotate in the opposite direction.

13. The device of claim 10 further comprising an elastic means for returning said bearing blade into a retracted position.

14. The device of claim 13 wherein said elastic means comprises a leaf spring which is secured in a slot provided on an outer periphery of said body.

15. The device of claim 14 further comprising a closing piece which is arranged in said body slot above said leaf spring towards said outer periphery of said body to ensure that said bearing blade is guided and maintained within said slot.

* * * * *